United States Patent [19]
Hart

[11] Patent Number: 5,833,325
[45] Date of Patent: Nov. 10, 1998

[54] FREIGHT BRAKE CONTROL USING TRAIN NET BRAKING RATIO

[75] Inventor: James E. Hart, Trafford, Pa.

[73] Assignee: Westinghouse Air Brake Company, Wilmerding, Pa.

[21] Appl. No.: 597,277

[22] Filed: Feb. 6, 1996

[51] Int. Cl.⁶ .................................................. R60T 13/00
[52] U.S. Cl. .............................. 303/7; 303/9.69; 303/22.6
[58] Field of Search ........................... 303/7, 3, 15, 22.1, 303/22.8, 9.69, 20

[56] References Cited

U.S. PATENT DOCUMENTS

| | | | |
|---|---|---|---|
| 4,402,047 | 8/1983 | Newton et al. | 303/3 X |
| 5,551,765 | 9/1996 | Sich | 303/20 X |

*Primary Examiner*—Robert J. Oberleitner
*Assistant Examiner*—Pamela J. Lipka
*Attorney, Agent, or Firm*—Buchanan Ingersoll, P.C.

[57] ABSTRACT

A railway freight brake system for operating vehicles in a train wherein each vehicle responds in braking situations as if its effective net braking ratio was a desired train net braking ratio. Embodiments include vehicles receiving a brake signal and utilizing either a received train net braking ratio or utilizing a stored on-board train net braking ratio to control pneumatic equipment on-board the vehicle to produce brake forces on the vehicle generally corresponding to the net braking ratio of the train. Some embodiments use a common train line control to communicate both train net braking ratio and brake signals to the individual vehicle. Individual vehicles can receive periodic or initial train net brake ratio values.

6 Claims, 7 Drawing Sheets

THEORETICAL: GSF = CYL. AREA * PRESSURE * LEVER RATIO
NSF = GFS * EFFICIENCY FACTOR

NET EQUATIONS:

(1) $F_N = (P-a) * N$ (2) $N = F_N/(P-a) = \dfrac{(F_1 - F_2)}{(P_1 - P_2)}$ (3) $P = (F_N/N) + a$ (4) $a = P - (F_N/N)$ WHERE: $F_N$ = NET (ACTUAL) BRAKE SHOE FORCE (LBS)
P = BRAKE CYLINDER PRESSURE (PSI)
a = BCP AT ZERO NSF
$F_1, P_1$ ETC = POINTS OR ACTUAL CORRESPONDING VALUES FOR F & P

FREIGHT BRAKE CONTROL USING TRAIN NET BRAKING RATIO

BACKGROUND OF INVENTION

This invention related to railway braking systems, specifically braking systems for railway freight trains.

Traditionally, railway freight braking systems have utilized a pneumatic brake system that is both operated by compressed air and in which the control functions are obtained through utilization of pneumatic valves. Prior freight brake systems included the use of a brake pipe or pneumatic communication between the locomotive and each individual car in a freight train. The pneumatic brake pipe was utilized in a multi-function role, including: charging reservoirs on-board each individual freight car; instituting brake application; and controlling the release of the brakes on the train. Such systems generally utilized on-board pneumatic control valves such as ABD, ABDW, ABDX, or DB-60 valves, with 26 TYPE Locomotive brake equipment or Microprocessor with like EPIC sold by Westinghouse Air Brake Company. It was the general practice to use identical functioning pneumatic control valves and related control sequencing on comparably equipped freight cars throughout the train, such that each car's braking sequencing would be similar. Freight cars have varying braking capabilities depending upon the mechanical linkages between the brake cylinder and the brake shoes. In addition, some cars may be equipped from time-to-time with either empty-load or load-sensing equipment which may vary the pneumatic pressure applied to the brakes based upon the specific load or weight of the individual car. The level of desired brake pressure was controlled by the brake pressure in the brake pipe, communicating with the locomotive. The advantages of such prior art system was the utilization of a single pneumatic communication running the length of the train. Some of the desired characteristics in evaluating a freight brake system include the speed with which braking can be initiated on each individual car, the specific value of the braking on each car, regulation of the in-train forces such that the braking is generally shared between cars without excessive pushing or pulling on the couplers connecting the cars, and the accurate regulation of the speed and deceleration of the freight train during overall operation.

It is desirable to limit in-train forces to reduce any damage that might occur to the cargo being carried in each car, and to provide optimum life and reduced maintenance to train equipment.

Current practice often requires that freight cars be utilized over different rail systems such that the specific operating parameters, such as brake pipe operating pressures, may vary from system to system. As a result the same car must be asked to perform over a variety of specific operational parameters, which may differ from the optimum design characteristics for which it was initially built.

Utilization of electrical signals from a locomotive to control brake operation has been utilized in both passenger trains and transit equipment. Typically, an electrical signal is sent the length of the train with the signal level controlling both the propulsion and the desired level of braking. Such electro-pneumatic braking systems are not generally utilized in freight brake operations due to the vastly different requirements between passenger and freight operation. Specifically, trains and transit equipment consist of a few cars, whereas freight trains often operate with 150 or more cars to a single train. Transit and passenger vehicles are typically lighter weight rail vehicles requiring less braking force than a 200 ton freight car. The transit vehicles often operate at very close intervals between stops and therefore seldom reach the high speeds of over-the-road freight trains. In addition, transit vehicles often use electrical dynamic braking where a portion of the braking results from a regenerative or generated electric current on-board each vehicle or pain of vehicle. Freight train braking on the other hand has traditionally relied solely upon frictional braking on each individual freight car. Electro-motive regeneration braking may also be used on freight locomotives that already have electrical motors on-board that vehicle. However, freight cars seldom have electrical propulsion drive motors contained thereon.

It would be highly desirable that freight cars contain a braking system which would optimize the braking of the overall train during their operation over various railroads and various operating parameters. Because the brake equipment on each individual freight car may be designed using different parameters and the operation conditions vary depending upon the brake pipe pressure utilized in different trains and on different railroads, it would be desirable that the freight brake system accommodate such variations under operating conditions.

SUMMARY OF INVENTION

The invention relates to a railway freight train brake equipment for operation on-board a railway freight vehicle. The railway freight vehicle has a friction brake which is actuated by a pneumatic brake cylinder, and the car has a reservoir which acts as a storage compartment for pressurized air. A brake signal indicative of a desired braking level of such train is transmitted to each freight car. On-board the railway freight vehicle a processor such as a microprocessor is used to calculate a brake cylinder pressure from the brake signal and a train net braking ratio. The calculated brake cylinder pressure is that which will result in a net shoe force the same as if the freight vehicle on which the microprocessor is located had a specific design net braking ratio equal to the train net braking ratio. By definition the design net braking ratio of a vehicle is the net or actual brake shoe force derived from 50 psi in the brake cylinder(s) divided by the car weight. The processor or microprocessor then can control valves to respond to said calculated brake cylinder pressure. In some embodiments an application and release valve may be used, and in other applications a single valve may be used. The microprocessor controls the brake cylinder pressure over a portion of the range of braking of such vehicle as if such vehicle had a net braking ratio that was generally equal to the train net braking ratio. In some embodiments the preselected operating train net braking ratio can be sent to the individual freight vehicle via the train line, either continuously or periodically. In other embodiments it may be desirable to only send the net train braking ratio at the initiation period prior to the train being started. In some versions of the invention the train net braking ratio may be predetermined and stored in memory on each car. Some embodiments may also have a default train net braking ratio. Certain train handling situations, such as at low braking levels or in grade situations, it may be desirable to utilize braking techniques other than using the train net braking ratio. Other embodiments of the invention are explained in the following description.

DESCRIPTION OF SOME EMBODIMENTS

Figure 1A:
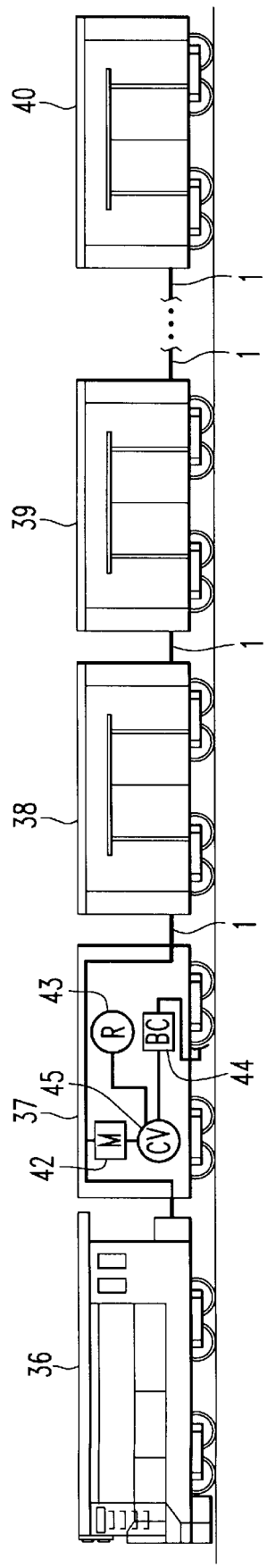
FIG. 1a is a diagrammatic representation of a railway freight train having a plurality of freight cars.

Freight trains can be slowed down or stopped using various degrees of service brake applications or stopped by emergency brake application. The conventional pneumatic brake system for freight cars is an equalizing type system, wherein the auxiliary reservoir pressure reduction generally matches the brake pipe pressure reduction. The resulting brake cylinder pressure is generally directly dependent on the volume relationship between the reservoir and the brake cylinder (including piping, clearance, and the voided piston displacement volumes which can vary from car to car). In emergency brake situations, the auxiliary and emergency reservoir pressures are both equalized with the brake cylinder volume, so that again the final pressure depends directly upon the specific volumes and their initial pressures.

The brake system is generally configured on each car such that the brake cylinder pressure falls within certain pre-described ranges for both service and emergency applications. By design, therefore, any brake application will cause the control valves to produce nominally equal brake cylinder pressures on all cars within the train. If all volumes and piston travels were exactly equal on each car and the system had no leaks, such brake cylinder pressure would be generally equal for all practical purposes. The system, by design, is intended to produce generally equal brake cylinder pressures on each car, in response to a specific brake pipe reduction. However, because of nominal variations in volume, piston travel, leakage, and grading, there may exist a fairly wide, somewhat random variance in the actual brake cylinder pressures throughout any given train for any give brake application. The variations in resulting brake forces, including the net brake shoe force and brake retarding force, are further compounded over the variations in brake cylinder pressures. Various freight cars built at different times can have different sizes and types of brake cylinders, differing mechanical linkage ratios, and widely different mechanical efficiencies. All of these factors directly effect the net brake shoe force that is produced by any given brake cylinder pressure on a given car. The effective coefficient of brake shoe friction then determines the brake retarding force generated by any given brake shoe force on a specific car.

With electro-pneumatic brakes it is possible to control the actual brake cylinder pressure more precisely than with conventional pneumatic brake systems. However, although it would be possible, it can be disadvantageous and undesirable to simply generate equal brake cylinder pressures on all cars in a freight train each time the brakes are applied. It is much more beneficial to optimize the braking effort on each individual car throughout the train, in some situations to achieve the smoothest possible train handling and to minimize the risk of damage to equipment and/or lading, and in other situations to achieve the best overall protection against wheel over-heating and potential wheel damage. While applicable to different types of train braking situations, each of these objectives insures improved brake efficiency and improved performance of train operation over that which would be achieved with equal brake cylinder pressures on each car.

There are three general purposes for which service air brake applications are used on heavy freight trains: brake applications to slow or stop the train; light applications to control the slack run-in and run-out in a long train; and applications to control or maintain the speed of a train on descending grades.

Typically, light to medium applications would be used to slow the velocity of a train, and fill service applications would be used to stop the train. When grade braking is required, usually only up to one-half of the available full service brake cylinder pressure is used. In grade braking dynamic braking will often be used on the locomotive to supplement friction braking on each individual car. When the total train retarding force exactly matches the grade accelerating force, zero acceleration is achieved and the velocity of the train is held constant.

Emergency brake applications are generally only used when it is imperative to stop a train in the shortest possible distance, or as a last resort to control train speed.

When decelerating or stopping a train, the ideal distribution of braking effort is to generate sufficient brake retarding force on each individual car to provide as closely as practical uniform individual car deceleration. This requires that the brake retarding force be somewhat proportional to the actual mass or weight of each car in the train. If the coefficient of brake shoe friction is assumed to be generally equal for all cars in the same train, where velocity and wheel temperatures will be very similar, then proportioning retarding force to weight can be achieved by having an equal operative net braking ratio on each car.

Effective net braking ratio can be defined as the actual total brake shoe force divided by the actual weight of the car. Design net braking ratio is generally considered to be the net braking ratio at 50 psi brake cylinder pressure.

It is not practical, nor will it usually be desirable, however, to brake fully loaded and empty cars in the same train at completely equivalent net braking ratios during train deceleration. At a given brake cylinder pressure or shoe force, the effective net braking ratio of empty and loaded cars of the same design is inversely proportional to their weight. This means that the empty car net braking ratio (and potential deceleration) could be four to six times higher than that of the fully loaded car at a given brake cylinder pressure.

One of the primary factors which limits the maximum design net braking ratio on loaded freight cars is the wheel temperatures which can be developed, which is controlled by the braking effort and the heat dissipation capacity of the wheels on the vehicle. On empty cars the limiting factor is generally the potential of sliding wheels, as governed by the available wheel to rail rolling adhesion. Due to potential heat dissipation demands and train action factors, the maximum desirable design net braking ratio on loaded 100 ton freight cars having 36 inch wheels is approximately 10 percent of the net braking ratio. For empty cars on the other hand, the typical historical maximum design net braking ratio (at 50 psi brake cylinder pressure) has been approximately 30 percent, to prevent wheel sliding.

It is usually neither necessary nor desirable to reduce the empty car net braking ratio clear down to 10 percent to match the maximum loaded car NBR. This would greatly reduce the available train brake retarding force of trains having a sufficient number of empty cars, and would further increase the heat dissipation demand on the wheels of loaded cars in a train consisting of mixed loaded and empty cars.

To better protect against wheel sliding on empty cars with less than ideal wheel to rail adhesion it is desirable to limit the maximum design net braking ratio on completely empty cars to approximately 20 percent NBR instead of the historical 30 percent. This would provide a highly effective protection against sliding wheels on empty cars and also achieve a generally optimum compromise between keeping an effectively high capacity of braking on empty cars (to benefit the entire train deceleration and control) while bringing the potentially full deceleration rates on empty and loaded cars much closer together limiting in-train forces.

Therefore the final objective is to allow fully loaded cars to be braked in a range of approximately 6.5 percent to 10 percent design NBR, and, at the same time to limit the maximum NBR on empty cars to 20 percent NBR. Given these objectives, it is necessary to define the optimum way to transition from the completely empty to the fully loaded car NBR for any and all partial load conditions in between. The design net braking ratio (DNBR) of a freight car is determined when the car is built, generally being based on the following formula:

$$DNBR = \frac{\text{Measured SHOE FORCE}}{\text{Loaded Car Weight}}$$

or $$DNBR = \frac{P \times L \times A \times N \times E}{W}$$

where:
P=pressure in the brake cylinder
L=lever ratio
A=the area of the piston(s) in the brake cylinder(s)
N=the number of brake cylinders
E=the mechanical efficiency
W=weight of the car It will be seen from the above equations, assuming a constant efficiency factor and a given car weight, the only variable in the formula will be the brake cylinder pressure. Therefore, varying brake cylinder pressure changes the effective or operative net braking ratio of the car. In determining a car's design net braking ratio, by definition a predetermined brake cylinder pressure is used in the foregoing equation. Generally a value of 50 psi is be used.

FIG. 1a shows a train having a locomotive 36 and a plurality of cars 37 through 40. As can be understood, freight trains can operate many more cars than shown, and typically one-hundred to two-hundred car trains are not uncommon. While FIG. 1a only depicts four freight cars, it is to be understood that multiple cars of any length can be used in practicing the invention. In addition, a diagrammatic representation of equipment on-board car 37 is shown, however it is understood that similar equipment can be placed on other cars in the train shown in FIG. 1a.

Car 37 shows a train line wire 1 which connects all of the freight cars to the locomotive. This freight train line could be an electrical conductor or fiber optic cable, and is used to convey information from one position on a train to other cars in the train. In some embodiments this will be used to transmit a brake signal indicative of the desired brake level to all of the cars, 37 through 40. Similarly, the train line 1 can be used to also send a pre-selected operating train net braking ratio value to all of the cars 37 through 40. As shown in FIG. 1a, car 37 has a microprocessor 42 which can receive control signals and information from the train line 1. The microprocessor can be used to control a valve means which may be one or more valves or similar devices which control the communication of fluid pressure from a reservoir 43 to a brake cylinder 44. Brake cylinder 44 applies a friction brake on car 37. As to be understood, cars 38, 39, and 40 can be comparably equipped as car 37.

Figure 1B:
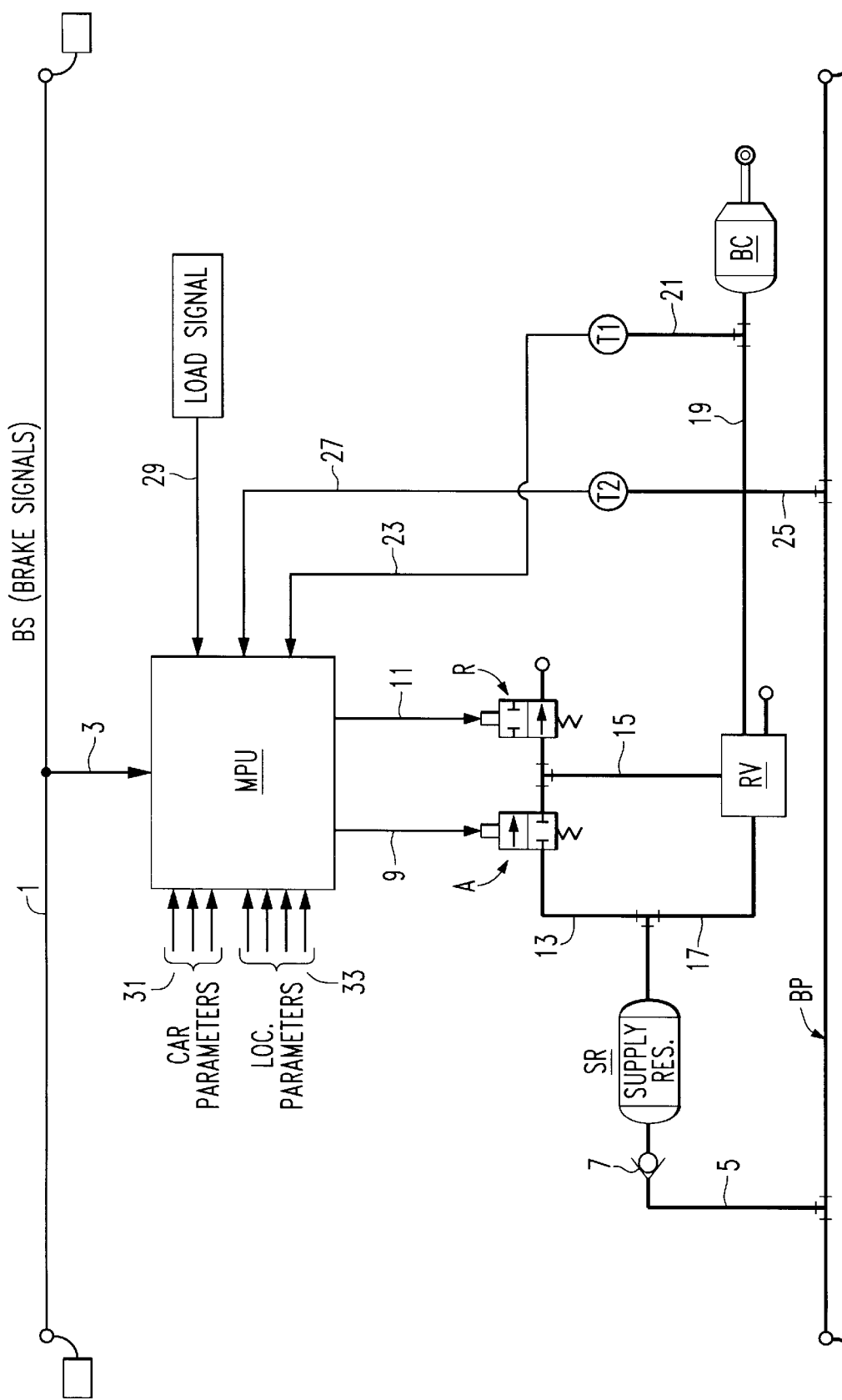
FIG. 1b is a diagrammatic view of a railway freight car brake system utilizing a microprocessor on-board the car which is utilized in accordance with some embodiments of the present invention.

FIG. 1b is a diagrammatic representation of an electro-pneumatic brake system on-board a railway freight car such as 37. The present invention can be implemented through the use of a microprocessor unit MPU to which a train line wire 1 is connected by a branch wire 3. It is understood that this embodiment shown in FIG. 1 utilizes a "hard wired" electrical train system in which the signal is delivered to the on-board microprocessor by way of one or more wires. Typically, such wire could be an electrical wire, although other embodiments could equally employ fiber optics. Similarly, radio transmission signals/receivers or other communication means to communicate with the car borne equipment could be used. Typically such systems, whether using radio, electrical wire, or fiber optics would be transmitting information from a central location, usually in the locomotive cab or other site off-board the individual freight car. Such signal could carry a desired level of braking signal and a signal representative of an operating NBR for the train. An application electromagnet valve A, and a release electromagnetic valve R respectively control the application and release functions. A relay valve such as RV, similar to a J type relay valve as manufactured by Westinghouse Air Brake Company, can be used in conjunction with the application (A) and release (R) valves to control supply of pneumatic pressure to a brake cylinder, BC. In some embodiments direct acting application and release valve mechanisms may be used, such that a relay valve may not be required. A supply reservoir, SR, to which a train line brake pipe, BP, is connected can also be connected to the brake cylinder via the relay valve, RV. Pneumatic pressure is supplied to the reservoir, SR, via a branch pipe 5 from the train line brake pipe, BP. A one way check valve, 7, may be used to maintain the supply reservoir, SR, charged to a pressure as carried in the brake pipe, BP and prevent discharge back into the BP. In addition, a brake pipe regulating valve (not shown) may also be used in some applications. Application electromagnetic valve, A, and release electromagnetic valve, R, are controlled by a microprocessor unit, MPU, via control wires 9 and 11 respectively. Application electromagnetic valve A is a normally closed, two position, two way, solenoid operated valve having a spring return. While electromagnetic release valve R is a normally open, two-position, two-way, solenoid operated valve having a spring return. The inlet port of application electromagnetic valve A is connected by a pipe 13 to supply reservoir SR, and the outlet port of valve A is connected by a pipe 15 to the control port of a relay valve RV. The electromagnetic application valve A is also connected to a port of the release electromagnetic valve R. The outlet port of release electromagnetic valve R is vented to the atmosphere. The supply port of relay valve RV is connected to a pipe 17 which is supplied from the supply reservoir SR. The delivery port of the relay valve RV is connected to a pipe 19 which communicates with the brake cylinder BC. The relay valve RV also has an exhaust port which is vented to atmosphere. A pressure to electric transducer T1 may also be used, and, if so, it may be connected through a pipe 21 to pipe 19, or may be directly connected to either the brake cylinder or the relay valve or pipe 19 or at any other convenient point. The transducer T1 is electrically connected to the microprocessor via wire 23 which could also be an optical fiber line. A similar transducer T2 may be connected to the brake pipe BP, directly on such as is shown via a pipe 25. Transducer T2 may also be connected at any other place in the car where the brake pipe pressure is readily available. Transducer T2 is electrically connected via wire 27 or optical fiber liner to supply a brake pipe pressure input to the microprocessor unit MPU.

Another input to the MPU can be a load signal such as shown at connection 29 where the varying car weight under operating conditions may be input to signify either a specific weight or an empty/load condition. Spring deflective or other load sensors may be used to supply the load signal, 29. Additional signals 31 may be input to give specific car parameters as hereinafter discussed through the microprocessor unit. Inputs 33 are available to supply the microprocessor units with variables which may be specific to the locomotive or the train operating conditions.

When a brake application system ed for the microprocessor unit energizes the system according to its internal operating instructions. Wires 9 and 11 cause the respective solenoid operators to switch positions to either apply or release the electro-magnetic valves. The electro-magnetic valve R is thus closed and the application electro-magnetic valve A is opened to conduct brake pipe pressure from the compressed air source in the supply reservoir SR to the relay valve RV. Relay valve RV is piloted to its application or release positions. Transducer T1 provides feedback information to the microprocessor corresponding to the instantaneous brake cylinder pressure. When the microprocessor determines that the necessary brake cylinder pressure has been reached, wire 9 may be de-energized to drop out the solenoid application magnetic valve A and thereby cause the relay valve RV to cutoff further pressurization of the brake cylinder BC.

Similarly, when the release or reduction of the brake application is desired, the microprocessor unit can de-energize wires 9 and 11 causing both the electro-magnetic valves A and R to assume their normal position, thereby causing the relay valve to vent to atmosphere portions of the brake cylinder pressure. The embodiments shown in FIG. 1b can be utilized in conjunction with the other teachings herein to control the specific braking on-board a freight car. Other similar known Controls of Application and Release valves to supply, lap, and release fluid pressure can be used with this invention, including the use of a single valve. It is understood that brake rigging is attached to the brake cylinder, and may be of any style or fashion including truck mounted or conventional.

This invention permits a preselected desired train net braking ratio, $NBR_T$, at which the brakes on all cars in any such train will operate. FIG. 1b shows a braking system which receives on-board a freight car vehicle a desired net train braking ratio signal and a braking signal and converts the braking signal into the actual desired brake cylinder pressure for such car as if it had the operating Train Net Braking Ratio. While individual cars may have design net braking ratios that differ from car to car in a given train, this invention permits the whole train to behave as if all cars had design net braking ratios equal to the train net braking ratio, $NBR_T$. The brake cylinder pressure is adjusted on each car for all brake applications, such that each car behaves as if its individual net braking ratio (its design net braking ratio) was exactly the preselected value of the train net braking ratio, $NBR_T$. Typically when a railway locomotive sends a desired brake level signal, two given cars may apply the identical desired brake cylinder pressure, but because of different net braking ratios each car although identically loaded may provide quite different levels of actual braking force, and therefore different deceleration rates may occur and substantial in-train forces may result.

In a typical embodiment of the present application, the locomotive train via the train line 1 may send an operating net braking ratio for the train, $NBR_T$. This $NBR_T$ signal could be an initial value which is sent only when the train is made up and begins to operate, or could be periodically sent along the train line 1. In other embodiments the net braking ratio for the train, $NBR_T$, may be communicated to each individual car in a different manner, and cars may in fact be pre-programmed to have a default value of $NBR_T$. Such values may be sent to the MPU and stored via 31 or 33. During operation each individual car stores the desired $NBR_T$ value on-board, and continues to receive normal brake signals $B_S$ via line 1 with regard to the desired level of braking sought by the locomotive engineer. In some systems this may be a desired nominal brake cylinder pressure, $BCP_T$, or it may be a brake pipe pressure reduction typical of that used in pneumatic systems. Regardless of how the desired braking signal is established, the on-board microprocessor for each car then can interpret it and using the $NBR_T$ properly apply the correct individual car brake cylinder pressure to arrive at the force based upon the train net brake ratio, $NBR_T$. In some instances the brake signal may be a percentage of handle control, such as 100 percent for full service, 75 percent, 35 percent, 25 percent, etc. may be desirable.

While in describing the present invention when is stated that each individual car then controls the brake cylinder pressure in that respective car to execute the given train net braking ratio; $NBR_T$ it is understood that the microprocessor permits an adaptability such that the train net braking ratio, $NBR_T$, will in many instances only be used over a certain range of operation of the brakes. Such range may typically include the service range of brake applications and in fact the microprocessor may control the individual car brake equipment to behave other than at the $NBR_T$ in an emergency mode, and/or for minimum brake applications, and/or other specific braking tasks. Typical characteristics that require an emergency application may dictate other than utilization of the $NBR_T$ characteristics which are desirable for the service mode. It is also possible, however, in some situations to utilize the $NBR_T$ for both service and emergency applications when desired.

In addition, due to the fact that mechanical efficiencies and friction at low force levels may vary on any given car, and in fact may vary from car to car, it may be desirable in many embodiments to indicate some minimum threshold level of braking which may occur before the $NBR_T$ operation is desirable. In addition, there may be other specific brake functions with regard to the car having excessively high loads, very low loads, etc. that may dictate other than a pure $NBR_T$ operation for certain ranges within the envelope of operation. The utilization of the microprocessor in a preferred embodiment of this invention makes it easy and highly desirable to provide overlays of other brake operations, such as grade and emergency controls which can further enhance the performance of the overall train braking.

Figure 2:
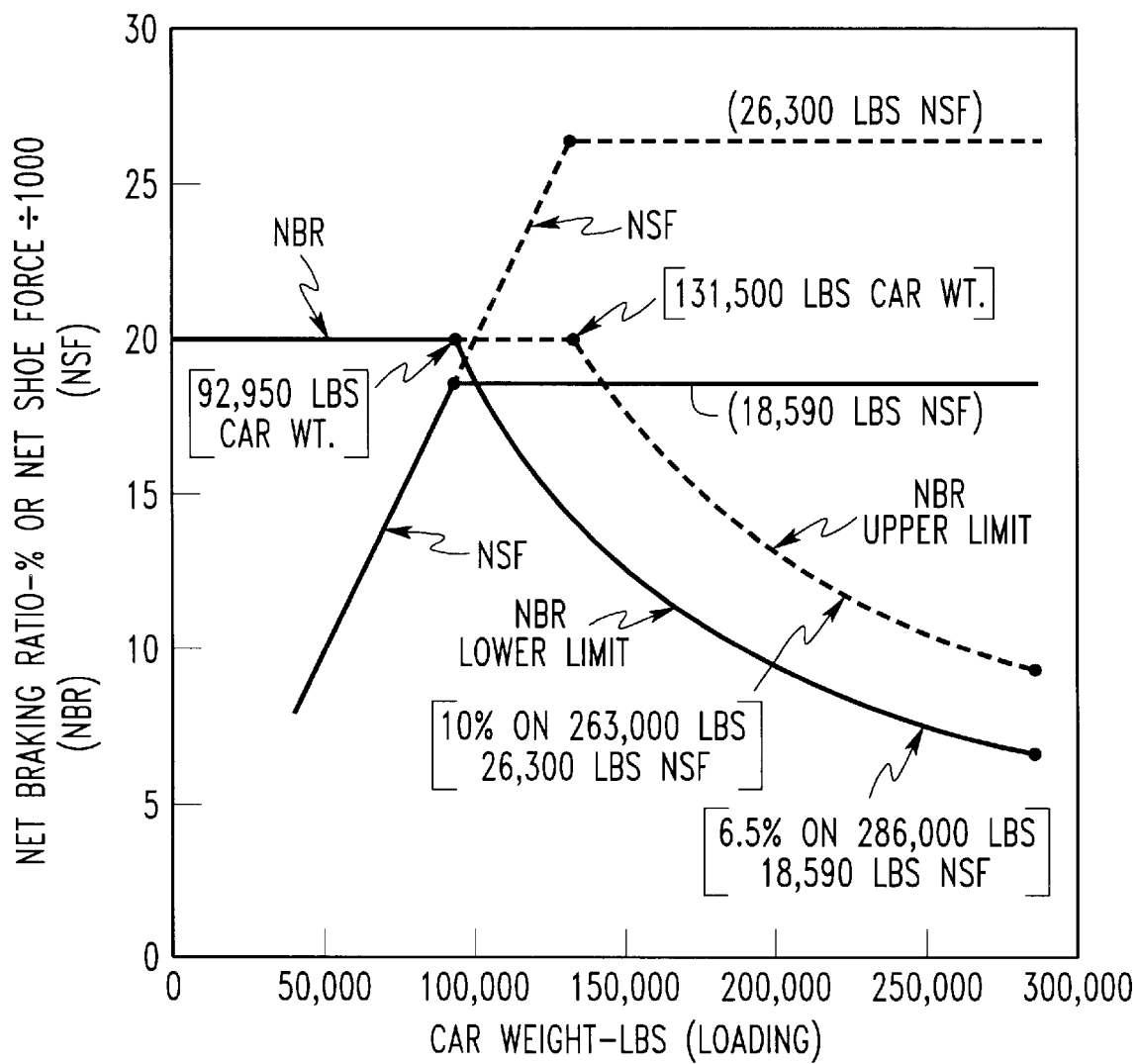
FIG. 2 is a graph showing relationship between net braking ratio and car weight.

FIG. 2 illustrates a preferred methodology for translating or blending the higher design net braking ratio on empty cars to the lower design net braking ratio of fully loaded cars, through the possible range of car loadings. The two NBR curves on this graph represent that practical minimum design NBR which might be desired, such as 6.5 percent on a fully loaded car weight on 286,000 pounds, as well as the normally accepted maximum NBR of 10 percent on 263,000 pounds. The net shoe forces required to obtain these two design NBRs are 18,590 pounds and 26,300 pounds respectively. These net shoe forces are allowed to be applied as the car weight becomes lighter, until the net braking ratios increase to 20 percent or the maximum desired level to protect against wheel slide. This occurs at a transition car weight of 131,500 pounds for the higher net shoe force and at 92,950 pounds for the lower net shoe force.

As the car weights are further reduced, down to any completely empty weight (generally between 43 and 63 thousand pounds) the net shoe force (NSF) is reduced linearly as required to keep a constant 20 percent effect net braking ratio. This meets the NBR definition:

$NBR = NSF \div W$ $NSF = NBR \times W$ where W=actual car weight
In this case, for light cars the net shoe force, $NSF = 0.2 \times W$.

The net braking ratios illustrated on FIG. 2 represent, by definition, the design net braking ratios for the cars, or the net braking ratio at 50 psi brake cylinder pressure. With the provisions of the present invention it is possible with an electro-pneumatic brake system to allow the railroad or the individual train operator to preselect an effective or equivalent loaded car design net braking ratio at which the train is to be operated. This can be set on the locomotive brake control microprocessor at any desired decimal value, such as between 0.065 and 0.100. In essence, this option will cause the entire train, including each of the individual freight cars to be braked as if their individual loaded design net braking ratio were all exactly the pre-selected value ($NBR_T$). Regardless of the preselected train $NBR_T$, the NBR can also be adjusted for car loading as illustrated by the upper and lower limits on FIG. 2. In addition the effective initial or operating brake pipe pressures can be set at the regulating valve on the locomotive brake stand to any pressure, such as for example between 70 psia and 110 psi.

When a conventional 26C pneumatic locomotive brake valve handle is rotated to apply the train brakes, a mechanical cam and cam follower act against the regulating valve spring to control the reduction of equalizing reservoir pressure, and consequently the brake pipe pressure, BP. The profile on the brake valve cam follows the general pattern of the curves shown on FIG. 3 with regard to the brake valve handle position and linear cam travel.

Figure 3:
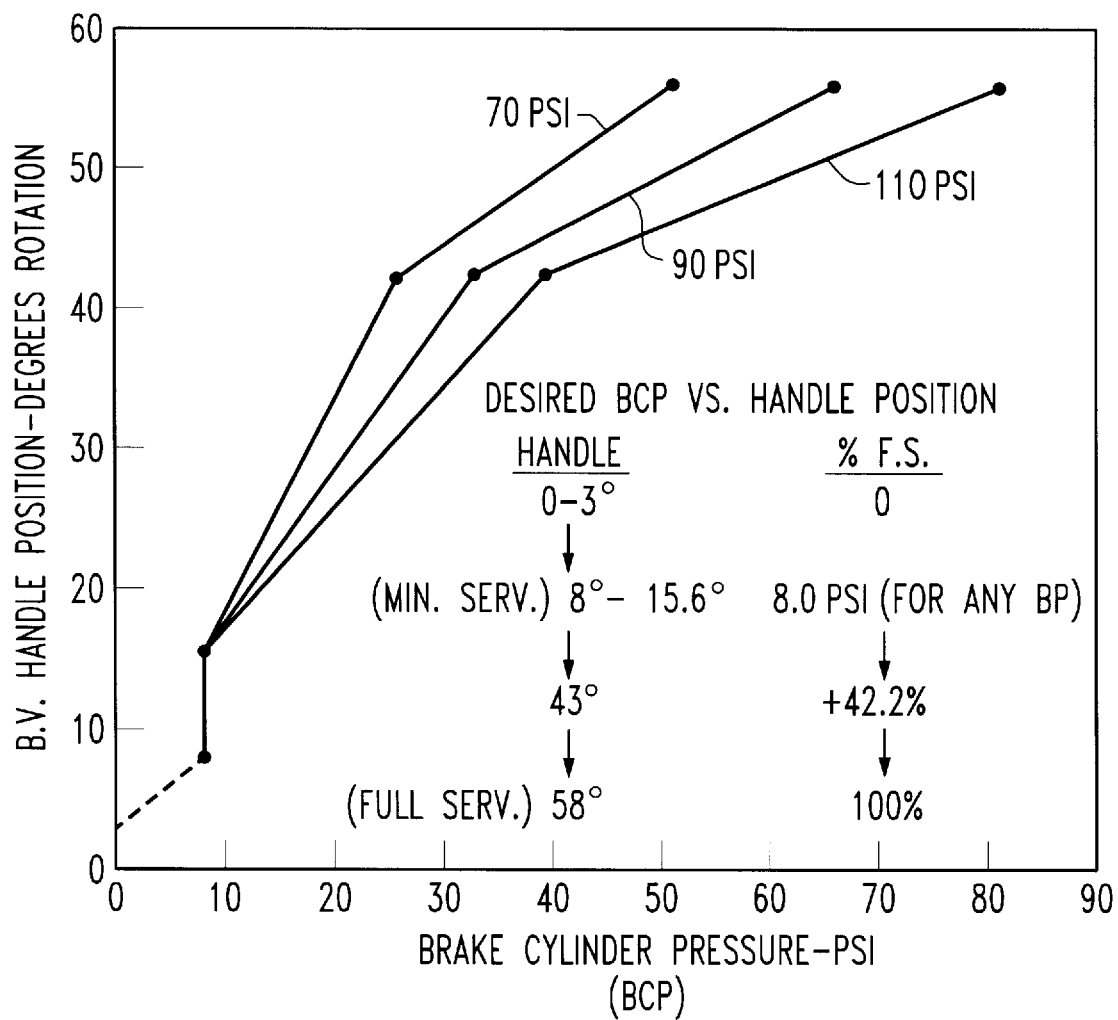
FIG. 3 is a graph showing brake valve handle position in degrees of rotation in relation to brake cylinder pressure in pounds per square inch.

With electro-pneumatic braking it is desirable to generally match the degree of service application produced by the conventional pneumatic brake system, to which train operators have become accustomed. Therefore, for the electro-pneumatic brake of the present invention, FIG. 3 represents the train brake cylinder pressure demanded throughout the service range of rotation of the brake valve handle, for three distinct initial brake pipe operating pressures. The minimum reduction zone, from approximately 8 degrees to 15.6 degree handle position, is interpreted to call for 8 psi train brake cylinder pressure, $BCP_T$, regardless of the initial brake pipe pressure $BP_i$. From 15.6 to 43 degree rotation, the brake cylinder pressure, $BCP_T$, increases linearly from 8 psi to a predetermined percentage (approximately 42.2 percent) of the difference between 8 psi and the full service pressure. From 43 degrees to approximately 58 degrees of handle rotation, the brake cylinder pressure for the train, $BCP_T$, increases linearly to the maximum full service pressure. Desired full service brake cylinder pressure varies with initial brake pipe pressure and can be generally calculated by the following equation:

$BCP_{TF} = 0.77\ BP_i - 3.8$ (using gauge pressure in psi)

When the brake valve handle is moved beyond the full service zone to emergency, the desired emergency brake cylinder pressure, $BCP_{TE}$, is indicated by the following equation:

$BCP_{TE} = 0.857 BP_i$ (gauge pressures)

These equations derive to generally match the standard equalization pressures produced by the conventional pneumatic brake system for full service and emergency brake applications, although the conventional system is subject to some variation.

In order to provide the desired uniformity of braking throughout the train, it is necessary to compensate for the widely varied design net braking ratio of all the individual cars that may be involved. This is achieved in the present invention by making use of certain values that are predetermined and may be semi-permanently stored in memory of the electronic car brake control on each individual freight car. For each group of new cars built to a common design, the AAR requires that car builders conduct brake shoe force measurement tests on a certain number of individual cars. This is to assure that the cars meet or fall within the prescribed net braking ratio range. In conducting such tests it is common practice to apply various predetermined and closely controlled brake cylinder pressures to the car brake cylinders and to measure the total net or actual brake shoe force thereby produced on all eight wheels. Such measurement may be obtained using calibrated, force measuring dynamometer brake shoes.

Figure 4:
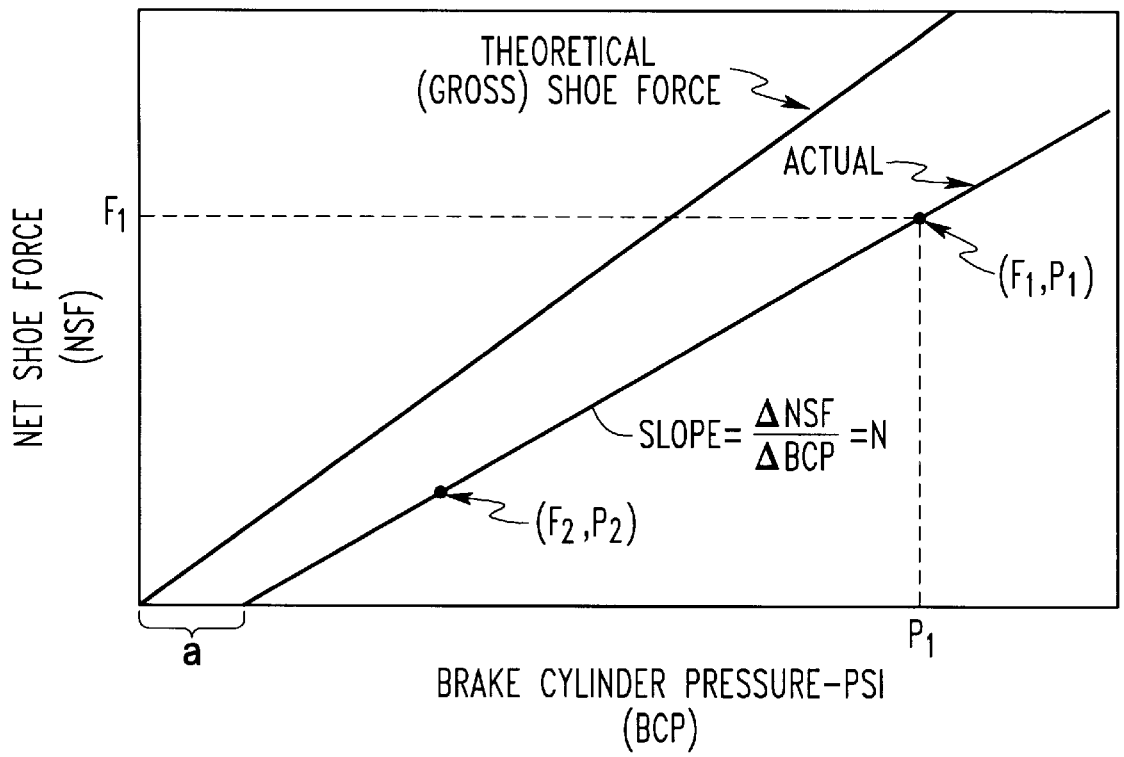
FIG. 4 is a graph showing relationships between brake cylinder pressure and net shoe force for typical freight car.

FIG. 4 shows a typical pattern for the relationship between brake cylinder pressure and net shoe force for a given freight car. The line through the origin represents the theoretical or "gross" shoe force. The offset line represents the actual or "net" brake shoe force. The theoretical neglects the friction loss due to the brake cylinder seals and fulcrum joints inherent in the mechanical systems, as well as the resistive force of the piston return spring. Both the theoretical and the actual relationships are typically generally linear functions of brake cylinder pressure, as illustrated. The brake rigging mechanical efficiency would be obtained by dividing the actual shoe force by the theoretical shoe force at any given brake cylinder pressure.

The general linear equations describing the relationship of the net shoe force and the brake cylinder pressures for any car can be calculated as follows:

$$F_N = (P - a) \times N \qquad (1)$$

$$N = F_N \div (P - a) = \frac{(F_1 - F_2)}{(P_1 - P_2)} \text{ (slope)} \qquad (2)$$

$$P = (F_N \div N) + a \qquad (3)$$

where:
$F_N$=net (actual) shoe force (measured in pounds)
P=brake cylinder pressure (psi)

N=slope a=brake cylinder pressure (P) at zero actual force (offset or intercept)

and ($F_1$, $P_1$) and ($F_2$, $P_2$) are force and pressure points or corresponding values for force and pressure at any given points on the graph.

Using these equations, it is possible to calculate either the brake cylinder pressure required to produce any given net shoe force, or to calculate the net shoe force that would be expected for any given brake cylinder pressure. In order to define the specific equations for any car, it is necessary to pre-determine values for a and N. These values may be obtained either from actual shoe force test results or by closely estimating these values using test results from identical cars or cars having very similar brake arrangements. In some instances it may be desirable to merely enter default values which closely represent the cars which will be operating on the train.

Specific values for the a and N are entered and may be stored semi-permanently in protected memory on each freight car microprocessor that is equipped with electro-pneumatic brake equipment of the present invention. These may be input, such as at terminals 31 on FIG. 1b.

Figure 5:
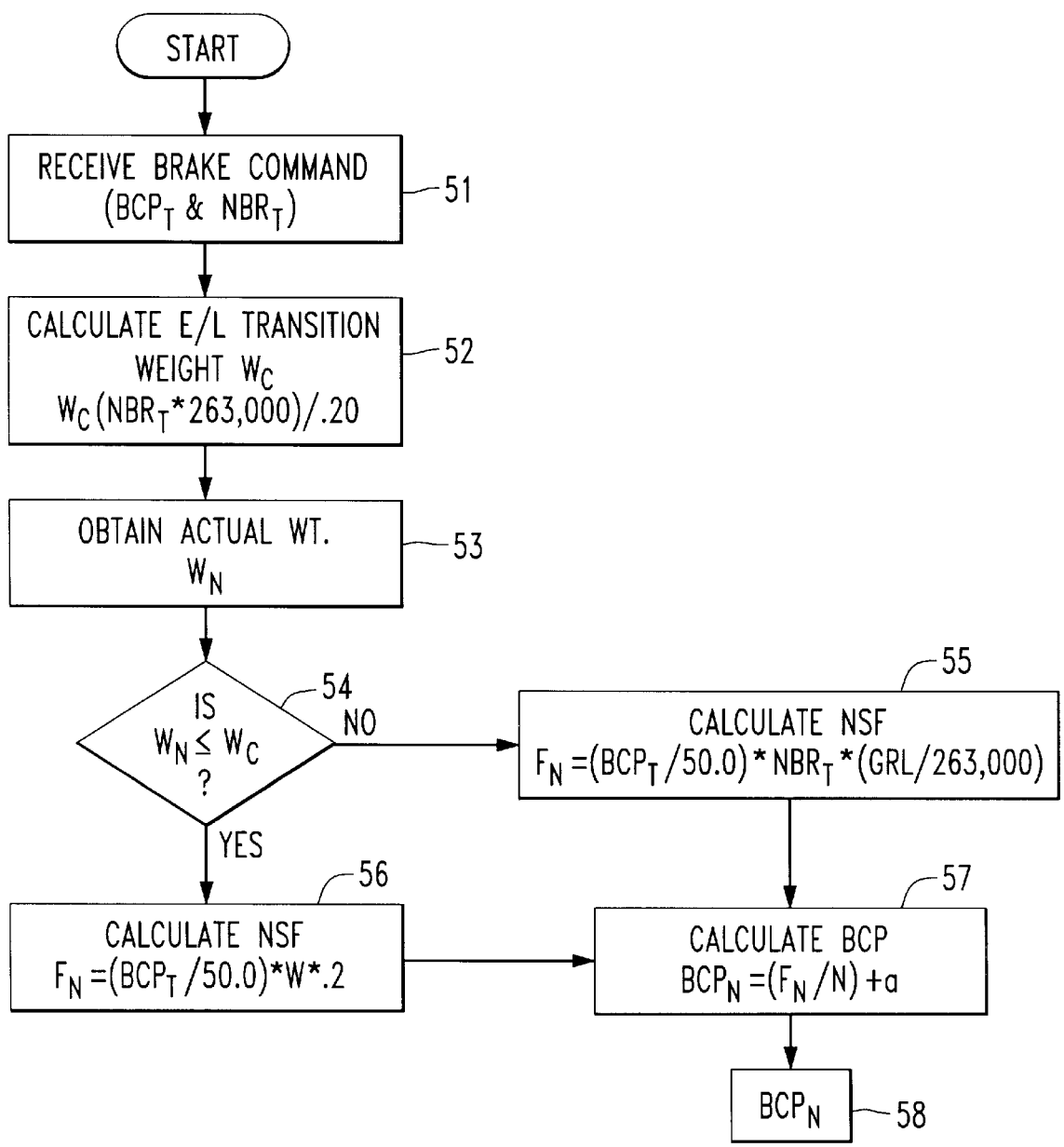
FIG. 5 shows a general flow chart for calculating brake cylinder pressure from a train net braking ratio and a train brake signal; in this instance the train brake signal is train brake cylinder pressure.

Referring now to FIG. 5 is shown an algorithm of the calculation which can be done on-board the railway vehicle to determine the brake cylinder pressure, $BCP_N$ of the Nth. This calculation is done by receiving the nominal brake cylinder pressure train command signal, $BCP_T$. As will be understood the calculations in comparison shown in FIG. 5 will most often be done in a microprocessor unit such as MPU shown in FIG. 1, although other means of performing these calculations can also be utilized consistent with this invention. As previously described the net braking ratio of the train, $NBR_T$, can be periodically transmitted along the train line wire 1 of FIG. 1b or a default value can be preselected and stored on board each freight car. Whatever manner the microprocessor unit has the ability to receive the net braking ratio for the train, $NBR_T$ for the necessary calculations. Assuming that the $NBR_T$ has been periodically transmitted or encoded into the brake signal on the train line wire at block 51 both the brake cylinder pressure of the train and the train net brake ratio available and received in block 51. These values are then utilized in the calculation of the empty load transition weight, $W_C$ as is shown in block 52. After the transition weight $W_C$ is calculated, in block 53 the actual weight of the Nth car, $W_N$ is obtained. This can be done in a number of means on-board the car and input to the multiprocessor unit of FIG. 1b via one of the car parameter inputs 31. The value of the car weight may also be obtained based upon pre-existing known load conditions for each car in the train, from a train consist list. In block 54 the car weight of the Nth car, $W_N$ is compared to the transition weight $W_C$. If the car weight $W_N$ is less than the transition weight the desired braking force of the Nth car $F_N$ is calculated as shown in block 56 based upon the brake cylinder pressure signal, $BCP_T$. If the comparison in block 54 indicates that the weight of the car $W_N$ is equal to or greater than the transition weight $W_C$ then the calculation of the net shoe force $F_N$ is calculated in block 55. The calculation in block 55 calculates the net shoe force, $F_N$ based upon the signals it has received corresponding to the train brake cylinder pressure $BC_P$ and the train net braking ratio $NBR_T$. In addition the GRL of the specific car is utilized in the calculation of the force requirement for that given specific Nth car. The calculated net shoe force $F_N$ is then transmitted to block 57 wherein the necessary brake cylinder pressure for the specific car $BCP_N$ is calculated based upon the net shoe force for the car, $F_N$ and the stored values N and A previously discussed with regard to FIG. 4.

Figure 6:
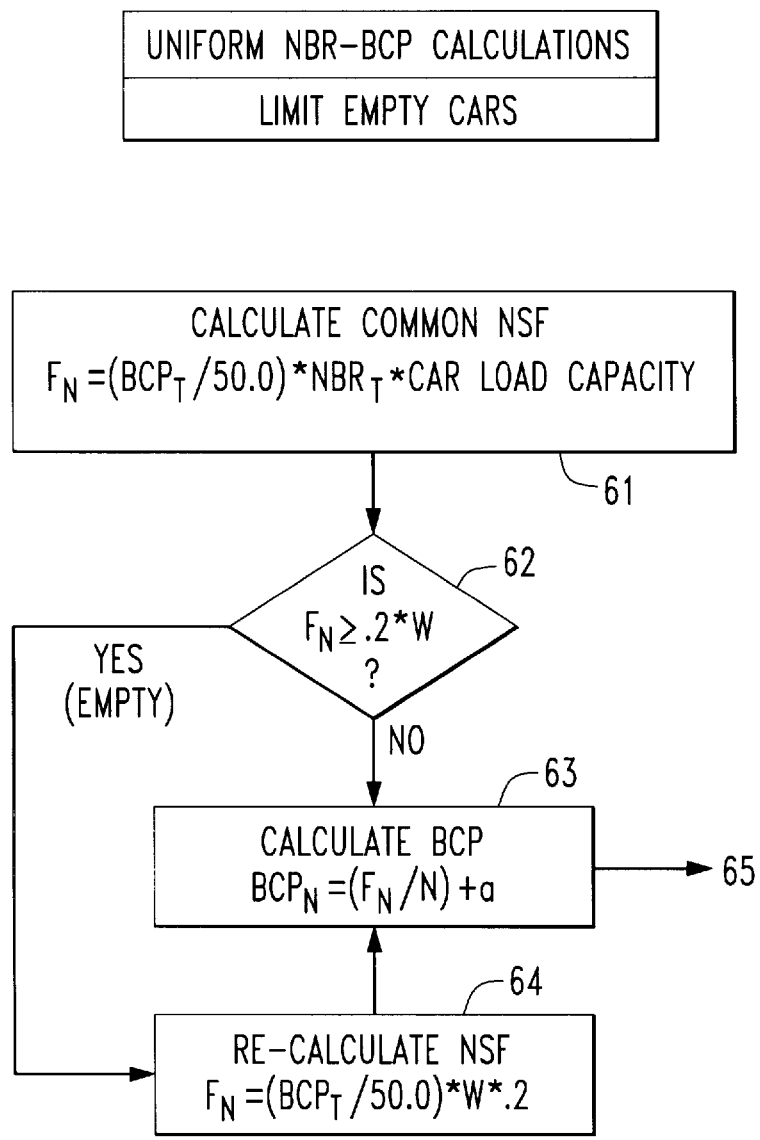
FIG. 6 shows a flow chart for a general method of calculating uniform net braking ratio from a train net braking ratio and a train brake signal, in this instance a nominal train brake cylinder pressure, $BCP_T$.

FIG. 6 shows an alternate flow diagram for the calculation of net shoe force and $BCP_N$. In FIG. 6 the net shoe force for the Nth car $F_N$ is calculated based upon the train net braking ratio and the train brake cylinder pressure signals. In addition the car load capacity is utilized. The car parameters as in the other instances can also be programmed into the MPU by the car parameters 31. The shoe force is then compared to a function of the weight. As shown, the value of 20% is utilized in 62. If the net shoe force as calculated for the Nth car is greater than 20%, then the calculation for net shoe force is redone in block 64. The revised $F_N$ calculation from block 64 or the initial $F_N$ from block 62 is then used in block 65 to calculate the required brake cylinder pressure for the Nth car, $BCP_N$.

The method depicted in the flow chart of FIG. 5 proportions the BCP on cars under the transition weight even for brake applications calling for less than 50 psi BCP. The method of FIG. 6, on the other hand, only limits empty car BCP if the requested BCP would produce an NBR exceeding 0.20.

While certain embodiments of the invention have been shown in the attached figures and discussed in this description it will apparent to those skilled in the art that other embodiments are equally included within the scope of this invention. This invention covers those other embodiments as included within the scope of the following claims.

I claim:

1. Railway freight brake apparatus for operation on-board a rail vehicle in a train, such vehicle having a friction brake actuated by a pneumatic brake cylinder and having a reservoir as a storage source of pressurized fluid, such apparatus comprising:

(a) at least one valve to control the pressurization of such brake cylinder from such reservoir;

(b) means for receiving a brake signal indicative of a desired braking level of such train and for receiving a train net braking ratio;

(c) a processor for calculating a brake cylinder pressure from said brake signal and said train net braking ratio to produce a net shoe force as if such vehicle had a design net braking ratio generally equal to said train net brake ratio;

(d) said processor controlling said valve to supply such brake cylinder with pneumatic fluid at said calculated brake cylinder pressure over a portion of a range of braking of such vehicle; and (e) wherein said range of braking of such vehicle includes a service application of braking and excludes an emergency brake application as determined from said brake signal.

2. The railway freight brake apparatus of claim 1 wherein said range of braking excludes a predetermined minimum braking level.

3. The railway freight brake apparatus of claim 1 wherein said range of braking excludes braking when such vehicle is descending a grade as determined from said brake signal.

4. A railway freight brake apparatus for operation of a train having a locomotive and freight vehicles attached to such locomotive, each of such vehicles having a friction brake actuated by a pneumatic brake cylinder and having a reservoir as a storage source of pressurized fluid, such apparatus comprising:

(a) means on such locomotive for transmitting a brake signal indicative of a desired braking level of such train;

(b) a plurality of such vehicles having means for receiving said brake signal indicative of a desired braking level of such train and for receiving a train net braking ratio;

(c) said plurality of vehicles each having at least one valve to control the pressurization of the respective ones of such brake cylinder and such reservoir;

(d) said plurality of vehicles each having a processor for calculating a brake cylinder pressure from said brake signal and said train net braking ratio for each vehicle;

(e) said processors being effective to control said respective valves to supply respective such brake cylinders with pressurized fluid at said calculated brake cylinder pressure over a portion of a range of vehicle braking to produce a net shoe force as if each vehicle had a design net braking ratio substantially equal to said train net braking ratio, and as if all of the vehicle brakes had the same design net braking ratio and generally equal to said train net braking ratio; and (f) wherein said range of braking of such train includes a service application and excludes an emergency application.

5. The railway freight braking apparatus of claim 4 wherein said range of braking excludes a predetermined minimum braking level.

6. The railway freight braking apparatus of claim 4 wherein said range of braking excludes braking when such vehicle is descending a grade as determined from said brake signal.

* * * * *